US010759219B2

(12) United States Patent
Nastasi et al.

(10) Patent No.: US 10,759,219 B2
(45) Date of Patent: Sep. 1, 2020

(54) LOW-FRICTION SEALING ASSEMBLY, SYSTEM FOR ENGAGEMENT WITH A BEARING RING, AND WHEEL-HUB UNIT EQUIPPED WITH SUCH A SEALING ASSEMBLY

(71) Applicant: Aktiebolaget SKF, Gothenburg (SE)

(72) Inventors: Antonia Nastasi, Partanna (IT);
Giorgio Barberis, Volpiano (IT);
Daniele Duch, San Gillio (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/031,006

(22) Filed: Jul. 10, 2018

(65) Prior Publication Data
US 2019/0061421 A1    Feb. 28, 2019

(30) Foreign Application Priority Data

Aug. 31, 2017  (IT) .......................... 102017000097823

(51) Int. Cl.
| F16C 33/78 | (2006.01) |
| F16C 33/58 | (2006.01) |
| B60B 27/00 | (2006.01) |
| F16J 15/32 | (2016.01) |
| F16J 15/3268 | (2016.01) |
| F16J 15/3264 | (2016.01) |
| F16C 19/18 | (2006.01) |

(52) U.S. Cl.
CPC ........ *B60B 27/0073* (2013.01); *B60B 27/001* (2013.01); *F16C 33/583* (2013.01);
(Continued)

(58) Field of Classification Search
CPC .... F16C 19/184; F16C 33/583; F16C 33/768; F16C 33/783; F16C 33/763;
(Continued)

(56) References Cited

U.S. PATENT DOCUMENTS 3,363,911 A * 1/1968 McKinven, Jr. ..... F16J 15/3232
277/349
4,252,329 A * 2/1981 Messenger ........... F16J 15/3264
277/551
(Continued)

FOREIGN PATENT DOCUMENTS

DE   102012002339 A1 *  9/2012  ............. B60B 35/12
DE   102013218635 A1 *  3/2015  ............ F16C 33/805
(Continued)

*Primary Examiner* — Marcus Charles
(74) *Attorney, Agent, or Firm* — Garcia-Zamor Intellectual Property Law; Ruy Garcia-Zamor; Bryan Peckjian

(57) ABSTRACT

Low-friction sealing assembly for a vehicle wheel-hub unit to be inserted in an annular space defined between a flanged rotating element and a stationary element, to protect at least one ring of rolling members arranged between the stationary element and the rotating element; the flanged rotating element being provided with a flange and a mounting seat delimited by a cylindrical bottom wall and by an axial shoulder arranged on the opposite side to the flange. Nominal dimensions of an internal diameter of a sleeve portion of an annular screen are substantially the same as nominal dimensions of an outer diameter of a cylindrical bottom wall of the mounting seat, and the axial shoulder has an entry edge with a substantially conical form for facilitating mounting of the annular screen on the rotating annular element.

13 Claims, 1 Drawing Sheet

(52) U.S. Cl.
CPC ........ *F16C 33/783* (2013.01); *F16C 33/7826* (2013.01); *F16C 33/7883* (2013.01); *F16C 33/7889* (2013.01); *F16J 15/3264* (2013.01); *F16J 15/3268* (2013.01); *F16C 19/184* (2013.01); *F16C 2226/70* (2013.01); *F16C 2326/02* (2013.01)

(58) Field of Classification Search
CPC .............. F16C 33/7883; F16C 33/7886; F16C 33/7879; F16C 33/7889; F16C 33/7826; F16C 2226/16; F16C 2326/02; F16C 2226/70; B60B 27/001; B60B 27/0073; F16J 15/3264; F16J 15/3268
USPC ....... 384/448, 477, 480–486, 544, 589, 488; 277/351–353, 402, 350, 403, 411
See application file for complete search history.

(56) References Cited

U.S. PATENT DOCUMENTS

| | | | | |
|---|---|---|---|---|
| 4,783,180 | A * | 11/1988 | Hayashi | B60B 27/00 384/448 |
| 5,004,248 | A * | 4/1991 | Messenger | F16J 15/3256 277/351 |
| 5,292,199 | A * | 3/1994 | Hosbach | F16J 15/3256 384/478 |
| 5,813,675 | A * | 9/1998 | Otto | F16C 33/7879 277/407 |
| 7,073,950 | B2 * | 7/2006 | Vignotto | F16C 33/78 384/482 |
| 8,167,500 | B2 * | 5/2012 | Furukawa | F16C 19/386 384/484 |
| 8,303,190 | B2 | 11/2012 | Shigeoka | |
| 9,328,771 | B2 * | 5/2016 | Duch | F16C 19/04 |
| 9,403,405 | B2 * | 8/2016 | Barberis | F16C 33/783 |
| 2012/0177315 | A1 | 7/2012 | Matsuki | |
| 2013/0127119 | A1 * | 5/2013 | Haepp | F16C 33/7863 277/351 |
| 2015/0151574 | A1 | 6/2015 | Barberis | |
| 2016/0003302 | A1 * | 1/2016 | Seno | F16J 15/3264 277/351 |
| 2018/0147886 | A1 | 5/2018 | Morello | |

FOREIGN PATENT DOCUMENTS

| | | |
|---|---|---|
| DE | 102016209109 A1 | 12/2016 |
| EP | 2878842 A1 | 3/2015 |
| WO | WO-2010013439 A1 * | 2/2010 ......... B60B 27/0005 |

* cited by examiner

LOW-FRICTION SEALING ASSEMBLY, SYSTEM FOR ENGAGEMENT WITH A BEARING RING, AND WHEEL-HUB UNIT EQUIPPED WITH SUCH A SEALING ASSEMBLY

CROSS-REFERENCE

This application claims priority to Italian patent application no. 102017000097823 filed on Aug. 31, 2017, the contents of which are fully incorporated herein by reference.

TECHNOLOGICAL FIELD

The present invention relates to a low-friction sealing assembly, in particular for equipping rolling bearings of wheel-hub units for vehicles. The invention also relates to a system for engagement between an element of the sealing assembly and a rotating ring of a rolling bearing forming part of a wheel-hub unit and to the wheel-hub unit thus equipped.

BACKGROUND

The sealing assemblies intended to equip the rolling bearings of wheel-hub units on the so-called "outer" or "outboard" flange side which supports the wheel, such as those described in U.S. Pat. No. 8,303,190 and in US2012/0177315, are formed by so-called "box" seals including a first and second annular screen, which have a generally L-shaped radial section and are mounted facing each other so as to define between the screens an annular chamber inside which a series of sealing lips are arranged, these being mounted on a fixed annular seal integral with one of the screens, generally the screen intended to remain stationary during use.

It has been found, however, that the screen, which is mounted on the ring rotating during use and therefore arranged adjacent to the wheel support flange, is displaced axially during use with respect to the bearing ring on which it is mounted, owing to the deflection of the flange, i.e. the deformations produced on the flange by the wheel when the vehicle goes around bends; therefore, it is known to provide the seat 20 for mounting the screen on the ring rotating during use with an axial stop, arranged axially on the opposite side to the flange, so as to axially lock in position on this side also the screen once it has been mounted in the mounting seat 20. The axial stop must, however, necessarily project axially with respect to the mounting seat 20 and, equally necessarily, the screen must have mounting dimensions which are the same as the dimensions of the mounting seat 20, namely smaller than the radial outer dimensions of the axial stop. Therefore, during mounting, the screen must manage to pass beyond the axial stop in the axial direction before being positioned inside the mounting seat 20 and it has been found that, in some cases, this passing movement tends to plastically deform the screen subsequently causing the engaging connection between screen and mounting seat 20 to come loose with the further drawback that the screen tends to rotate relative to the mounting seat 20 and about its own axis owing to the deformations.

These drawbacks, on the one hand, increase the friction acting on the sealing assembly, since the sealing lips not making sliding contact (and therefore not producing friction) may make sliding contact (and therefore produce friction) and the sealing lips which may be of the sliding contact type increase their interference and therefore the friction produced. Furthermore, in the case of relatively large displacements or rotations, an interference may be generated between the rotating screen and the stationary ring of the bearing, with the generation of very high friction levels and possible damage to the sealing assembly and even, in the worst case scenario, damage to the rolling members of the bearing.

SUMMARY

The object of the present invention is to provide a sealing assembly comprising a screen rotating during use and a system for engagement of this screen with a ring, rotating during use, of a rolling bearing which do not have the drawbacks described, while also having a low production cost and being easy to produce, as well as ensuring a high degree of protection of the rolling members and having small axial and radial dimensions, along with a low friction level.

In accordance with the invention, therefore, a sealing assembly and a system for engagement of a screen of this sealing assembly with a ring of a rolling bearing are provided, these having the characteristic features described in the attached claims.

A wheel-hub unit having an outer stationary ring. An inner rotating ring having an end provided with a flange opposite to the outer ring. At least one ring of rolling members arranged between the outer ring and the inner ring. A sealing assembly has a screen provided with a sleeve portion integral with the inner ring and delimited by a lateral mounting surface in relation to the inner ring having a cylindrical form, and with a flange portion that extends radially projecting from the sleeve portion. The screen being mounted radially arranged between the outer ring and the inner ring so that the flange portion is axially arranged inside an annular space comprised between the flanged end and the outer ring so that the sleeve portion is keyed inside a mounting seat of the inner ring delimited by a cylindrical bottom wall and by an axial shoulder arranged on the opposite side to the flange. Wherein the nominal dimensions of an inner diameter of the sleeve portion of the annular screen are substantially the same as the nominal dimensions of an outer diameter of the cylindrical bottom wall of the mounting seat and in combination, the axial shoulder has an entry edge with a substantially conical form for facilitating mounting of the annular screen on the rotating annular element, and a radial thickness with respect to the outer diameter of the cylindrical bottom wall of the mounting seat with dimensions to prevent a plastic deformation of the sleeve portion of the annular screen during the mounting step.

BRIEF DESCRIPTION OF THE DRAWINGS

The invention will now be described with reference to the accompanying drawings which illustrate a non-limiting example of embodiment thereof, in which.

DETAILED DESCRIPTION

Figure 1:
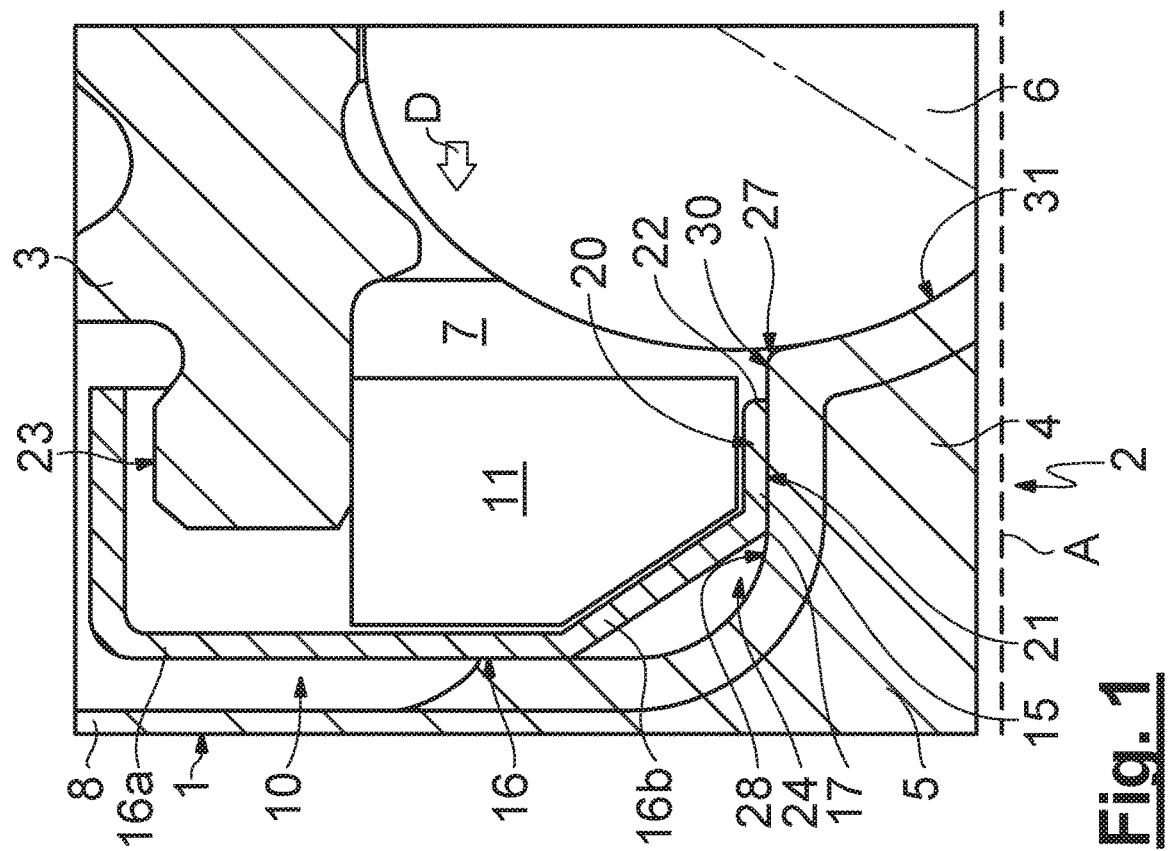
FIG. 1 shows in schematic form a radially sectioned, longitudinal elevation view, with parts removed for easier understanding, of a wheel-hub unit provided according to the invention and incorporating a sealing assembly according to the invention.

With reference to FIG. 1, 1 denotes a low-friction sealing assembly, in particular designed to be mounted on a wheel-hub unit 2 of a vehicle, the sealing assembly 1 during use forming an integral part of the unit.

The wheel-hub unit 2 comprises an outer ring 3, which during use is stationary, an inner ring 4, which during use rotates about an axis A which is also the axis of symmetry of both the rings 3 and 4 and the sealing assembly 1, and at least one ring of rolling members 6 arranged between the outer ring 3 and the inner ring 4, which are coaxial with each other; the ring 4 has an end 5 provided with a flange 8 opposite to the outer ring 3 and intended to carry a vehicle wheel during use.

The sealing assembly 1 can be inserted inside an annular interspace 7 defined between the rotating inner ring 4 and the stationary outer ring 3 of the wheel hub 2 and, more generally, between the rotating element 4 and the stationary element 3, coaxial with each other, of a generic rolling bearing of any known type forming part of, or integrated with, the wheel-hub unit 2.

The sealing assembly 1 is arranged between the rings 3 and 4, inserted inside the annular space 7, so as to protect the rolling members 6 arranged between the stationary element 3 and the rotating element 4 and comprises: an annular screen 10 formed by means of shearing and pressing of a metal sheet, preferably made of stainless steel, as well as an assembly 11 defined by a second annular screen and by a lip seal, both of the known type and shown schematically in FIG. 1 by means of broken lines.

The screen 10 is provided with a sleeve portion 15 defined by a tubular solid of revolution, during use integral with the rotating element 4, and a flange portion 16, which extends radially projecting from the sleeve portion 15, in the non-limiting example shown, on the opposite side to the axis A, and therefore radially outwards, from an elbow 17 of the sleeve portion 15 facing the flanged end 5.

In the case in question, the flange portion 16 comprises an annular wall 16a transverse to the axis A and arranged axially adjacent to the flange 8, and a conical annular wall 16b arranged between the annular wall 16a and the sleeve portion 15 extending form the elbow 17. The annular wall 16a extends in a radial direction outside of the annular space 7, radially projecting with respect to a radially outer side surface 23 of the ring 3, which ring 3 therefore faces the radially outermost part of the flange portion 16.

According to one aspect of the invention, in order to prevent during use the screen 10 from being able to move towards the ring 3 and the assembly 11, the seal 1 according to the invention comprises a screen, in the case in question the screen 10, which has a sleeve portion 15 delimited in relation to the inner ring 4 by a lateral mounting surface 21 for performing mounting on the rotating element defined by the ring 4 having a cylindrical form and an inner diameter $\phi m$. The whole sleeve portion 15 is defined by a tubular solid of revolution about the axis A, which has a conical form with an inner diameter $\phi m$ at the elbow 17 extending as far as its free end 22, opposite to the elbow 17, having an inclination with respect to the axis A of between 1° and 3°.

Alternatively, according to a preferred embodiment of the screen 10, the entire sleeve portion 15 may also be defined by a tubular solid of revolution about the axis A which has, however, a cylindrical form with a constant inner diameter $\phi m$ extending from the elbow 17 as far as a free end 22 thereof, opposite to the elbow 17. The choice between the two forms of the sleeve portion 15, i.e. cylindrical or conical, may depend, for example, on the choice of the material of the screen 10, as well as on the axial length of the sleeve portion 15, but, in both cases, as will be explained below, the sleeve portion 15 will always work in an elastic field ensuring the desired results. The description which follows will refer, for the sake of easier illustration, to the sole case of a screen 10 provided with a sleeve portion 15 having a conical form with the inner diameter $\phi m$ being understood as being always at the elbow 17, but the details described will be applicable in any case also to version of a screen 10 provided with a sleeve portion 15 having a cylindrical form.

According to a further aspect of the invention, the screen 10 is made of a pressed and sheared metal sheet so that the sleeve portion 15 is elastically deformable at least between its free end 22 and the elbow 17.

By means of the form which is imparted to the sleeve portion 15, a complete system for engagement of a generic sealing assembly, in the case in question the screen 10 of the sealing assembly 1, with a rotating annular element, in the case in question the inner bearing ring 4, is provided according to the invention, the system being indicated overall by 24.

Figure 2:
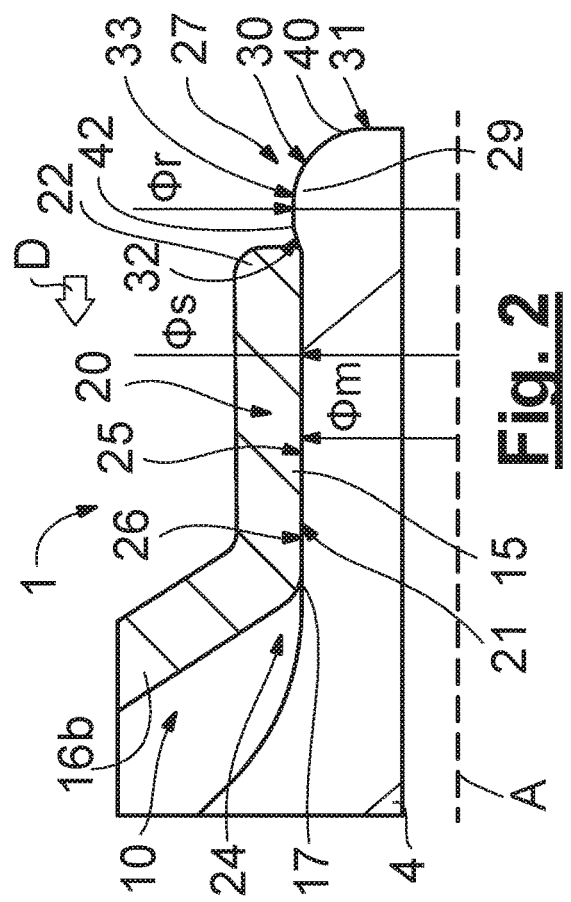
FIG. 2 shows in schematic form a radially sectioned, larger scale view of a detail of a screen forming part of the sealing assembly according to FIG. 1 and a system for engagement of this screen with a ring of a rolling bearing forming part of the wheel-hub unit shown in FIG. 1.
Figure 3:
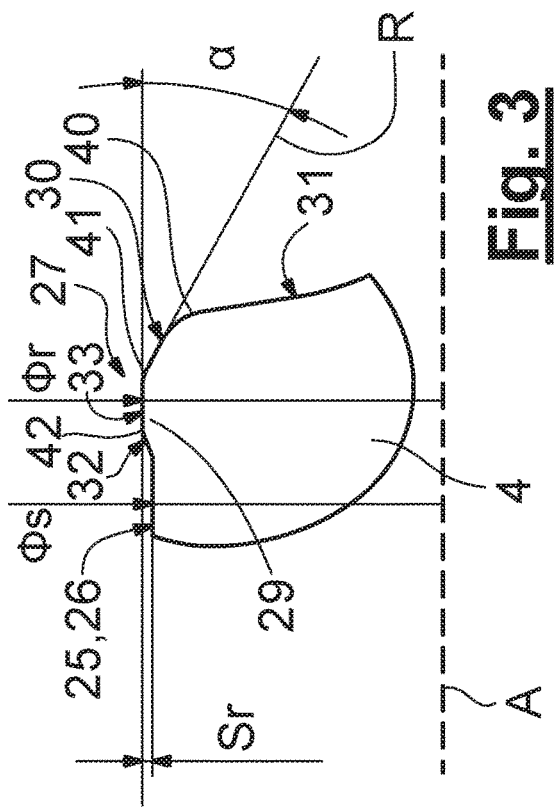
FIG. 3 shows, on an even larger scale, the details of the engagement system according to the invention.

The engagement system 24 comprises the annular screen 10 of the sealing assembly 1 and in particular the sleeve portion 15 intended during use to be engaged integrally with the rotating annular element 4, inside a mounting seat 20 of the latter, and the mounting seat 20 itself, where the sleeve portion 15 is delimited by the lateral mounting surface 21 having an inner diameter $\phi m$ at the elbow 17; and where the mounting seat 20 for the screen 10 on the rotating annular element 4 comprises in turn:

an annular inset zone 25 (FIGS. 2 and 3) formed in a lateral press-fit surface 28 of the rotating element, i.e. of the inner ring 4 in the example shown, normally intended during use to receive the screen 10 and radially delimited on the outside by a cylindrical end wall 26 with a constant outer diameter $\phi s$; and an axial shoulder 27, which is arranged on the opposite side to the flange 8 and axially delimits on the opposite side of the flange the annular inset zone 25.

The axial shoulder 27, according to a further aspect of the invention, is defined by an annular projection or boss 29 which delimits the inset zone 25 from a free front annular edge 30 of the rotating annular element 4; in the example shown, in which this rotating annular element is defined by the inner ring 4 of a wheel-hub unit 2, the free front edge 30, in addition to forming an entry edge for the annular boss 29, also defines a raceway 31 for the rolling members 6 arranged on the side where the flange 8 is located. The axial shoulder 27 includes bend 40 between linearly extending free front edge 30 and linearly extending raceway 31.

The annular projection 29 of the rotating annular element has a radial cross-section (FIGS. 2 and 3) with a rounded saw tooth profile and is defined, towards the raceway 31, by the free front edge 30 which has a conicity converging towards the axis A and which "widens out" or tapers, on the opposite side of the flange 8. In other words, a straight generatrix R of the free front edge 30 converges towards the axis of symmetry A, intercepting the axis of symmetry A at a vertex or apex of the conical surface, or a cone delimited by the conical surface, and is inclined with respect to the axis of symmetry A at an angle $\phi s$ having a value preferably of between 5° and 45°, and more preferably between 5° and 35°, and even more preferably between 5° and 25°.

Moreover, the annular projection 29 is again defined, towards the raceway 31, by a cylindrical surface 33, which is adjacent and connected to the free front edge 30 and has a constant outer diameter φr with dimensions greater than the diameter φs of the mounting seat 20, and, towards the inset zone 25, by a conical surface 32, which is adjacent and connected to the cylindrical surface 33, has a conicity directed on the opposite side to the conicity of the free front edge 30 and engages with the bottom wall 26 so as to form, in the region of the annular inset zone 25, an axial locking element for the free end 22.

The diameter φs of the mounting seat 20 has, according to the invention, dimensions substantially the same, at least nominally, as the dimensions of the diameter φm, measured at the elbow 17, of the lateral surface 21 for mounting the sleeve portion 15 and such as to provide an interference, forced or slightly forced fit between the sleeve portion 15 and mounting seat 20. Still according to the invention, the diameter φs of the mounting seat 20 also has dimensions smaller than the dimensions of the outer diameter φr of the cylindrical surface 33 of the annular projection 29 so as to define for the annular projection 29 a radial thickness Sr measured from the diameter φs having dimensions preferably comprised between 0.03 and 0.12 mm and even more preferably between 0.03 and 0.08 mm.

The use of a cylindrical sleeve portion 15 in combination with a mounting seat 20 also having a cylindrical press-fit surface like the bottom wall 26 and, in particular, the use of an annular projection 29 with a thickness Sr and with a free front edge 30, or entry edge 30, inclined at the angle α not only surprisingly results in the screen 10 being mounted in a definitively stable manner, but also allows insertion thereof in the insertion direction D without practically any plastic deformation of the screen 10, i.e. of the sleeve portion 15. In fact, the entry edge 30 which has, rising upwards in the direction of insertion D, a diameter increasing up to the value of the outer diameter φr of the cylindrical surface 33, is initially intercepted by the elbow 17 of the screen 10, namely by the sleeve portion 15 and since, as already implicitly described above, the dimension of the diameter φm of the lateral mounting surface 21 is smaller than the dimension of the outer diameter φr of the cylindrical surface 33, the sleeve portion 15, starting precisely from the elbow 17 and gradually along the whole of its axial length as far as the free end 22, is gradually expanded, radially in all the directions from the axis A, while remaining within the elastic limits of the material of the screen 10 or at least of the sleeve portion 15.

So that this radial expansion occurs uniformly at each point of the inner circumference of the sleeve portion 15, the angle α, as described above, has a value preferably of between 5° and 45°, and more preferably between 5° and 35°, and even more preferably between 5° and 25°. The closer the angle α is to the most preferred angle of between 5° to 25°, the better and more gradual will be the expanding effect of the entry edge 30 on the sleeve portion 15 of the screen 10. Moreover, by realizing the angle α with a value of 45° or less, a corner 41, albeit jointed, formed between the entry edge 30 and the cylindrical surface 33, will be less pronounced and the interference between the annular projection 29 and the elbow 17, or the sleeve portion 15, will be smaller, preventing completely any plastic deformation of the sleeve portion 15. Taking into account the stability of the nominal engagement between the sleeve portion 15 and the mounting seat 20 it is in any case preferable that the angle α should have a value closer to the bottom limit of the aforementioned ranges.

Once the elbow 17 has passed beyond the corner 41 in the direction of insertion D, the sleeve portion 15 starts to slide in direct contact with the outer surface 33 of the annular projection 29, the radial thickness Sr of which will be all the closer to the most preferred value of between 0.03 to 0.08 mm, the easier will be the passing movement of the sleeve portion 15 against the annular projection 29, namely the better will be the sliding effect of the sleeve portion 15 on the annular projection 29 without the sleeve portion 15 being subject to the formation of plastic deformations, but only to presence of elastic deformations caused by the aforementioned gradual expansion. As the sleeve portion 15 gradually passes over, in the direction of insertion D, a jointed corner 42 formed between the outer surface 33 and the conical surface 32, it will slide over the latter conical surface 32, coming to rest inside the mounting seat 20 and assuming again elastically its nominal dimensions, namely adhering to the bottom wall 26 of the mounting seat 20. When the free end 22 of the sleeve portion will have also completed its descent along the conical surface 32, the elasticity of the material of the material of the screen 10 will allow a kind of snap-engagement between the free end 22 and the engaging point of the conical surface 32 with the bottom wall 26, completing the axial locking of the screen 10 on the opposite side of the flange 8, which starts as soon as and substantially at the same moment in which the annular wall 16a of the flange portion 16 comes into contact against the flange 8 itself.

Owing to the combined action of the inclination of the entry edge 30 at the angle α as described above and the radial thickness Sr of the annular projection 29 as described above, the sleeve portion 15 may engage inside the mounting seat 20 without any residual plastic deformation, namely with nominal engagement of the diameter Φm and the diameter Φs, in other words with engagement as per design and with the necessary interference for preventing any rotation of the screen 10. Moreover, the absence of residual plastic deformation in the screen 10 fully enhances engagement between two cylindrical elements such as the cylindrical sleeve portion 15 and the mounting seat 20.

Lastly, according to a further aspect of the invention, in order to facilitate even further assembly of the screen 10, namely the passing movement and sliding of the sleeve portion 15 beyond the annular projection 29, the entry edge 30, outer surface 33 and conical surface 32 are all joined together at the corners 41 and 42 by means of connecting surfaces having a radius of curvature with dimensions preferably of between 0.15 and 0.80 mm and more preferably between 0.15 and 0.35 mm. These connecting surfaces will help ensure an even more gradual elastic deformation of the sleeve portion 15 from the undeformed state to the deformed state and vice versa.

According to the invention, owing to the engaging system 24, a wheel-hub unit 2 such as that already described above is obtained, where the screen 10 has a cylindrical keying portion which engages with the inner ring 4, situated between the flange 8 and the raceway 31 adjacent thereto. Moreover, preferably in combination with this characteristic feature, the inner ring 4 has, between the flanged end 5 and a free front edge 30, or entry edge 30, thereof which delimits the raceway 31 for the rolling members 6, a cylindrical side surface 28 provided with a mounting seat 20 for the sleeve portion 15 of the screen 10, which mounting seat 20 is defined by an annular inset zone 25 delimited by a cylindrical bottom wall 26 and an axial shoulder 27 arranged on the opposite side to the flange portion 16.

It is understood that the invention is not limited to the embodiments described and illustrated here which are to be regarded as examples of embodiment of the low-friction sealing assembly, these being instead subject to further modifications as regards the form and arrangement of parts as well as the constructional and assembly details.

What is claimed is:

1. A low-friction sealing assembly for a vehicle wheel-hub unit, comprising:
   the low-friction sealing assembly being configured to be inserted in an annular space defined between a flanged rotating element and a stationary element, coaxial with each other, so as to protect at least one ring of rolling members arranged between the stationary element and the rotating element;
   wherein the flanged rotating element is provided with a flange and a mounting seat delimited by a cylindrical bottom wall and by an axial shoulder arranged on the opposite side to the flange, the axial shoulder being configured as follows: (1) a conical surface extending outwardly from the mounting seat to a first corner, (2) a convex outer surface extending between the first corner and a second corner, wherein a maximum radius of the axial shoulder is located along the convex outer surface, (3) a front edge extending linearly from the second corner to a first end of a bend, (4) a raceway extending linearly from a second end of the bend and the sealing assembly comprising an annular screen that is provided with:
      a sleeve portion that is integral with the rotating element inside the mounting seat and is delimited by a lateral mounting surface in relation to the rotating element having a cylindrical form; and
      a flange portion radially projecting from the sleeve portion.

2. The low-friction sealing assembly according to claim 1, wherein the front edge defines an entry edge which is inclined with respect to a central axis of the rotating element at an angle having a value of between five degrees (5°) and forty-five degrees (45°).

3. The low-friction sealing assembly according to claim 1, wherein a radial thickness of the axial shoulder with respect to the outer diameter of the cylindrical bottom wall of the mounting seat has dimensions of between zero point zero three millimeters (0.03 mm) and zero point twelve millimeters (0.12 mm).

4. The low-friction sealing assembly according to claim 1, wherein
   the nominal dimensions of an inner diameter of the sleeve portion of the annular screen are substantially the same as the nominal dimensions of an outer diameter of the cylindrical bottom wall of the mounting seat.

5. The low-friction sealing assembly according to claim 4, wherein the entry edge is inclined with respect to a central axis of the rotating element at an angle having a value of between five degrees (5°) and forty-five degrees (45°).

6. The low-friction sealing assembly according to claim 4, wherein a radial thickness of the axial shoulder with respect to the outer diameter of the cylindrical bottom wall of the mounting seat has dimensions of between zero point zero three millimeters (0.03 mm) and zero point twelve millimeters (0.12 mm).

7. The low-friction sealing assembly according to claim 1, wherein the front edge defines an entry edge which is inclined with respect to a central axis of the rotating element at an angle having a value of between five degrees (5°) and thirty-five degrees (35°).

8. The low-friction sealing assembly according to claim 1, wherein the front edge defines an entry edge which is inclined with respect to a central axis of the rotating element at an angle having a value of between five degrees (5°) and twenty-five degrees (25°).

9. A wheel-hub unit comprising:
   an outer stationary ring,
   an inner rotating ring having an end provided with a flange opposite to the outer ring,
   at least one ring of rolling members arranged between the outer ring and the inner ring, and
   a sealing assembly comprising a screen provided with a sleeve portion integral with the inner ring and delimited by a lateral mounting surface in relation to the inner ring having a cylindrical form, and with a flange portion that extends radially projecting from the sleeve portion, the screen being mounted radially arranged between the outer ring and the inner ring so that the flange portion is axially arranged inside an annular space comprised between the flanged end and the outer ring so that the sleeve portion is keyed inside a mounting seat of the inner ring delimited by a cylindrical bottom wall and by an axial shoulder arranged on the opposite side to the flange, the axial shoulder being configured as follows: (1) a conical surface extending outwardly from the mounting seat to a first corner, (2) a convex outer surface extending between the first corner and a second corner, wherein a maximum radius of the axial shoulder is located along the convex outer surface, (3) a front edge extending linearly from the second corner to a first end of a bend, (4) a raceway extending linearly from a second end of the bend.

10. The wheel-hub unit according to claim 9, wherein the front edge defines an entry edge that is inclined with respect to a central axis of the rotating element at an angle having a value of between five degrees (5°) and forty-five degrees (45°).

11. The wheel-hub unit according to claim 9, wherein a radial thickness of the axial shoulder with respect to the outer diameter of the cylindrical bottom wall of the mounting seat has dimensions of between zero point zero three millimeters (0.03 mm) and zero point twelve millimeters (0.12 mm).

12. The wheel-hub unit according to claim 9, wherein the front edge defines an entry edge which is inclined with respect to a central axis of the rotating element at an angle having a value of between five degrees (5°) and thirty-five degrees (35°).

13. The wheel-hub unit according to claim 9, wherein the front edge defines an entry edge which is inclined with respect to a central axis of the rotating element at an angle having a value of between five degrees (5°) and twenty-five degrees (25°).

* * * * *